United States Patent [19]

Tadokoro et al.

[11] Patent Number: 4,881,204
[45] Date of Patent: Nov. 14, 1989

[54] OPTICAL READING OR WRITING APPARATUS

[75] Inventors: Michihiro Tadokoro; Hitoshi Imai; Kazuo Okada, all of Amagasaki, Japan

[73] Assignee: Mitsubishi Denki Kabushiki Kaisha, Tokyo, Japan

[21] Appl. No.: 185,052

[22] Filed: Apr. 22, 1988

[30] Foreign Application Priority Data

Apr. 28, 1987 [JP] Japan .................. 62-105866

[51] Int. Cl.[4] .............................. G11B 7/08
[52] U.S. Cl. ........................ 369/46; 369/44; 369/292
[58] Field of Search ............ 369/46, 44, 258, 261, 369/292

[56] References Cited

U.S. PATENT DOCUMENTS 4,631,712 12/1986 Matsubayashi et al. ......... 369/44
4,769,806 9/1988 Takamori ........................ 369/292

FOREIGN PATENT DOCUMENTS 57-186237 11/1982 Japan .
60-135817 9/1985 Japan .

Primary Examiner—Aristotelis M. Psitos
Attorney, Agent, or Firm—Fleit, Jacobson, Cohn, Price, Holman & Stern

[57] ABSTRACT

An information-carrying medium having the form of a disc is rotated around a central axis. The temperature of the disc is controlled by a temperature-adjusting element facing the surface of the disc.

9 Claims, 5 Drawing Sheets

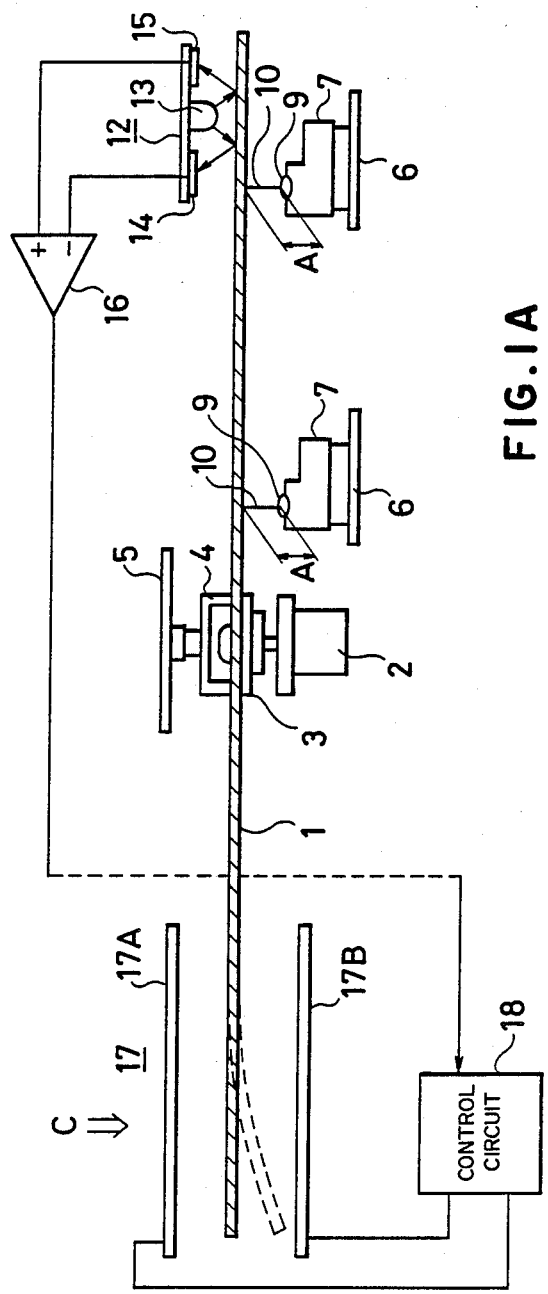
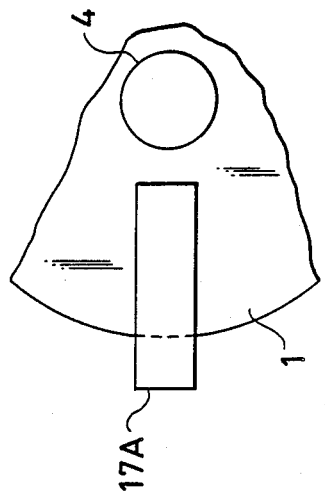
FIG.1
FIG.1A

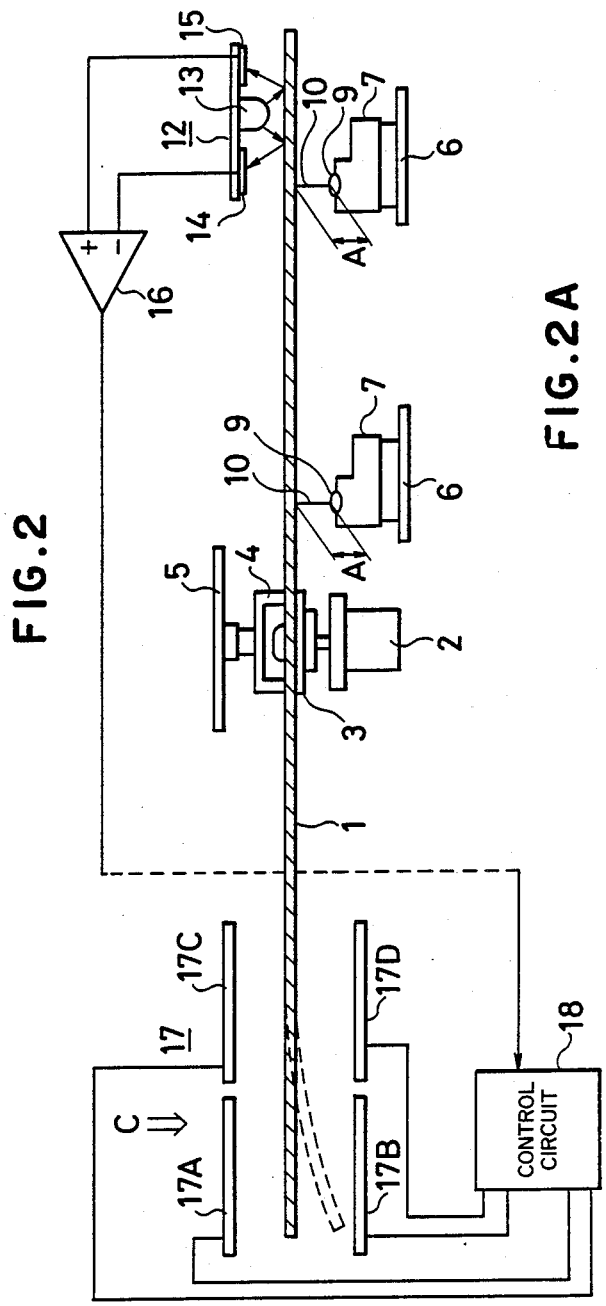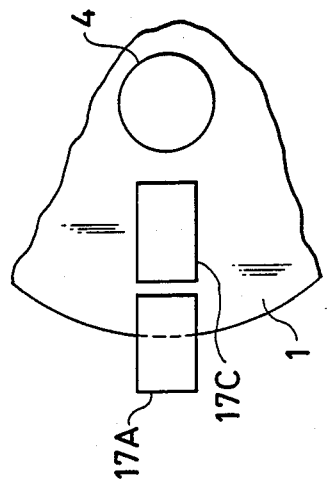

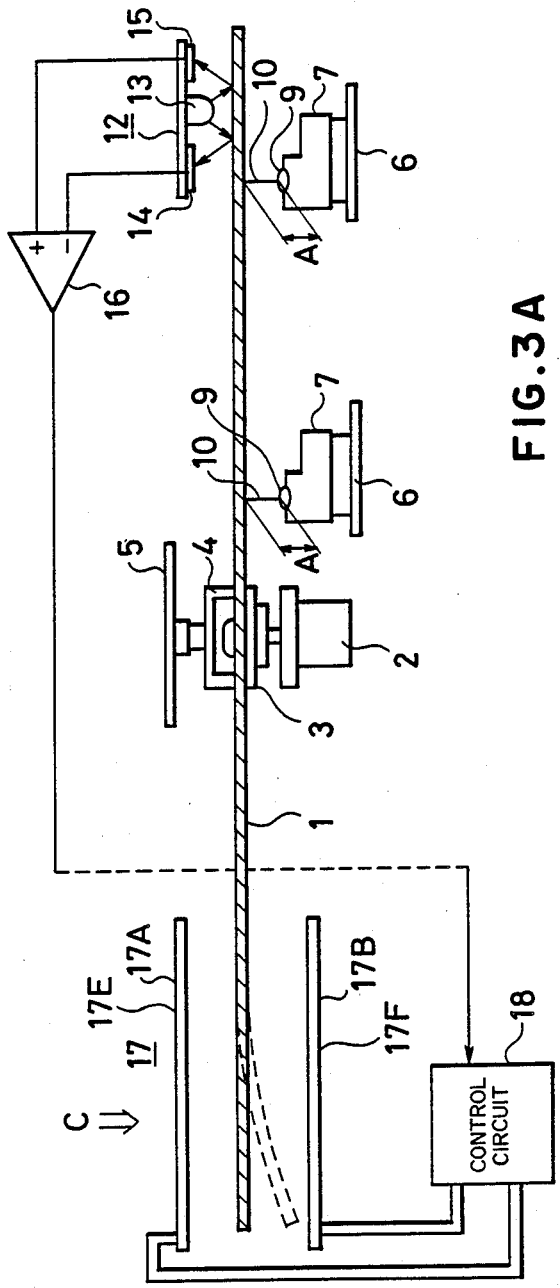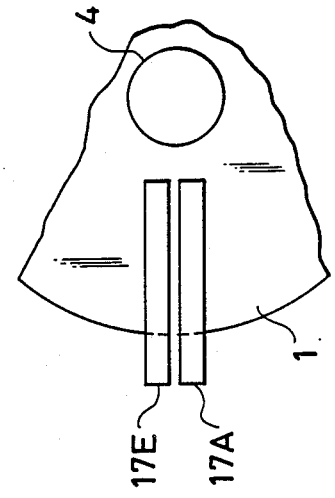

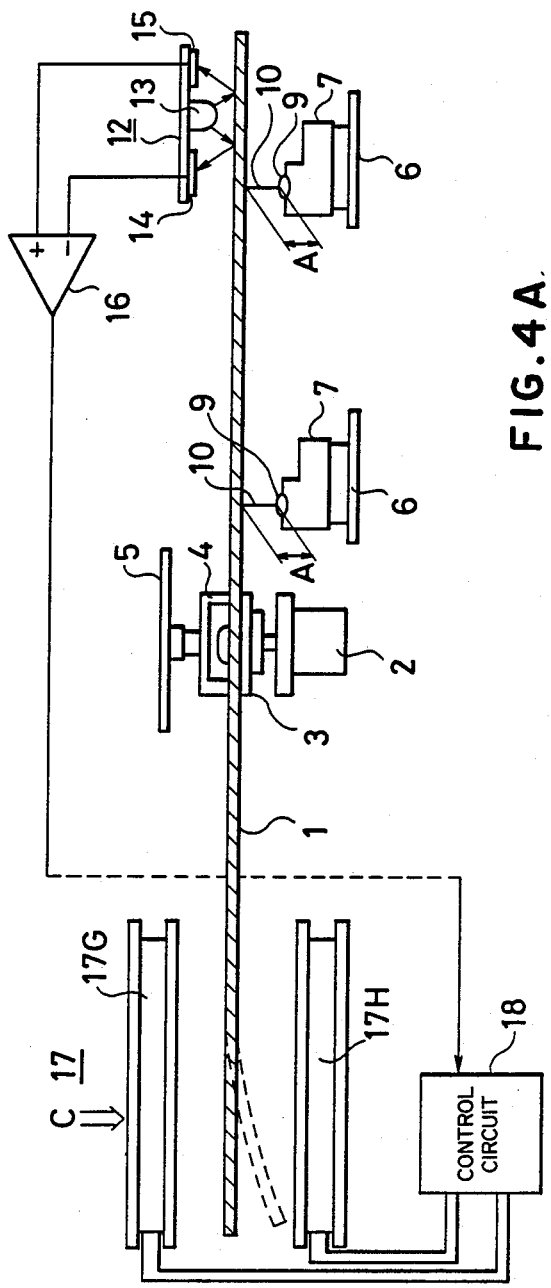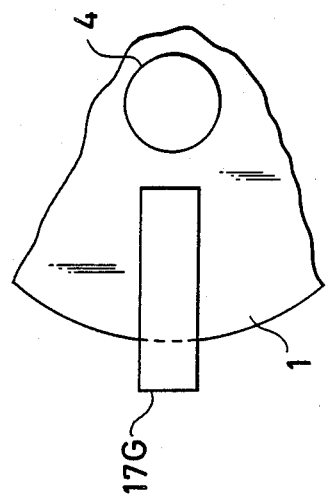
FIG.4
FIG.4A.

OPTICAL READING OR WRITING APPARATUS

BACKGROUND OF THE INVENTION

This invention relates to optical reading or writing apparatus such as an optical disc memory for reading or writing information by light, more particularly to the apparatus for maintaining perpendicularity between the information-carrying medium and the optic axis of the incident beam of light.

FIG. 5 is a cross-sectional view of an optical reading or writing apparatus of the prior art, as presented in Japanese Utility Model Application Laid-open No. 135817/1985 and Patent Application Laid-open No. 186237/1982. The apparatus comprises: a disc-shaped information-carrying medium 1 that rotates around a central axis and on which information can be written and read by means of light; a spindle motor 2 to turn the information-carrying medium 1; a turntable 3 that supports the information-carrying medium 1 and transmits the revolution of the spindle motor 2; a clamper 4 that rotates together with the information-carrying medium 1 and holds it against the turntable 3; a clamper mount 5 that supports the clamper 4 while permitting it to turn freely; a sliding base 6 free to slide in the radial direction of the information-carrying medium 1; an optical head 7, mounted on the sliding base 6, that illuminates the information-carrying medium 1 with a light beam; a shaft 8 that supports the optical head 7 on the sliding base 6 and enables it to be tilted; an objective lens 9 mounted on the optical head 7, for directing the light beam onto the information-carrying medium 1, the lens being free to move both parallel to the optic axis 10 (in the focusing direction) and perpendicular to the optic axis 10 (in the tracking direction); and a tilt servo mechanism 11 for tilting the optical head 7 with the shaft 8 as a pivot. The optical head 7 and related components are shown in two positions in this drawing, one position near the center of the information-carrying medium 1 and one position near the circumference.

FIG. 6 is an enlarged view showing a detection means 12 for detecting any deviation from perpendicularity between the optic axis 10 and the surface of the informationcarrying medium 1. The detection means 12 comprises a lightemitting element 13, photosensors 14 and 15, and an operational amplifier 16 for the signals output by the photosensors 14 and 15. The detection means 12 can be mounted on the optical head 7 with the photosensors 14 and 15 located at equal distances from the light-emitting element 13. Any inclination of the detection means 12 with respect to the surface of the information-carrying medium 1 causes a difference in the intensity of light received by the two photosensors 14 and 15. The signal output from the operational amplifier 16 therefore indicates the inclination between this surface and the optic axis.

In an optical reading or writing apparatus with the structure of the prior art as described above, the information-carrying medium 1 is held between the turntable 3 and the clamper 4 as shown in FIG. 5 and rotated by the spindle motor 2. Due to shrinkage immediately after manufacture, aging changes, temperature variations, and other factors, the information-carrying medium 1 is generally warped into a concave shape as shown in the drawing.

When the sliding base 6, which slides in the radial direction of the information-carrying medium 1, reaches a position under the non-horizontal part of the surface near the circumference of the information-carrying medium 1, the optic axis 10 of the light beam from the optical head 7 mounted on the sliding base 6 is no longer perpendicular to the recording surface of the information-carrying medium 1. This state is detected by the detection means 12 shown in FIG. 6. In response to the signal output from the operational amplifier 16, the tilt servo mechanism 11 then operates to tilt the optical head 7 around the shaft 8 until perpendicularity between the optic axis 10 and the surface of the information-carrying medium 1 is restored.

If the optic axis 10 were permitted to remain nonperpendicular to the surface of the information-carrying medium 1, the spot of light would be focused onto the surface in a distorted shape. This causes such problems as follows. Namely, in information recording, the pits (holes) representing the information would be formed inaccurately on the surface, and in information reading, a carrier-to-noise ratio is reduced and a number of errors is increased. It would also become difficult to maintain tracking control; that is, to keep the spot right on the track on or from which the information should be recorded or reproduced. In digital optical disc systems using a diffraction method of tracking control to keep the spot right on the track, there would be considerable error in writing the information signal.

Since these problems are the result of nonperpendicularity between the optic axis 10 and the surface of the information-carrying medium 1, the tilt servo mechanism 11 tilts the optical head 7 to maintain a perpendicular relationship. The objective lens 9 also moves at the time of tilting, so the distance between the objective lens 9 and the surface of the information-carrying medium 1 undergoes considerable variation. In FIG. 5, the distance varies by as much as A to B between locations at which the surface of the information-carrying medium 1 is horizontal and locations at which it is not. In compensation for this variation, the objective lens 9 is moved parallel to the optic axis 10 to keep the light beam in focus on the recording surface of the information-carrying medium 1.

A problem in the optical reading or writing apparatus of the prior art as described above is that since the objective lens 9 must be sufficiently movable parallel to the optic axis 10 to adjust the focus, and the objective lens 9 is mounted on the optical head 7, the optical head 7 has to be fairly large. A large tilt servo mechanism 11 is also required to tilt the optical head 7. The large mass that must therefore be driven on the sliding base 6 in the radial direction of the information-carrying medium 1 raises an obstacle to high-speed driving (high-speed access to the information).

SUMMARY OF THE INVENTION

An object of the present invention is to solve the problems stated above.

Another object of the invention is to provide an optical reading or writing apparatus wherein an optical head is small in size and no tilt servo mechanism is required, hence a high driving (access) speed is possible.

According to the invention, there is provided an optical reading or writing apparatus comprising
an information-carrying medium on which information can be read or written optically, the information-carrying medium having the form of a disc rotating around a central axis and receiving a light beam from an optical head that is driven in the radial direction of the disc, a detection means located near the information-carrying medium, for detecting the angle between the optic axis of the light beam and the surface of the information-carrying medium.

a temperature-adjusting element located near and facing the surface of the information-carrying medium, for creating a temperature difference between the two surfaces of the information-carrying medium and thereby causing a thermal deformation that bends the information-carrying medium in a desired direction, and a control circuit for receiving a signal from the detection means and controlling the temperature-adjusting element by supplying energy to it in such a way as to maintain a perpendicular relationship between the surface of the information-carrying medium and the optic axis.

In this invention, perpendicularity between the surface of the information-carrying medium and the optic axis of the light beam incident on this surface is easily maintained. Besides preventing degradation of the reading and writing characteristics of the information, this invention enables the mechanism for focusing the light beam to be simplified, the size of the optical head to be reduced; and the tilting mechanism to be eliminated, thus allowing the optical reading or writing apparatus to operate with a high driving (access) speed.

BRIEF DESCRIPTION OF THE DRAWINGS

FIG. 1 is a cross-sectional drawing of an embodiment of the present invention in an optical reading or writing apparatus.

FIG. 1A shows a view of the embodiment shown in FIG. 1 from the direction of the arrow C.

FIG. 2 is a cross-sectional drawing of a second embodiment of the invention.

FIG. 2A shows a view of the second embodiment shown in FIG. 2 from the direction of the arrow C.

FIG. 3 is a cross-sectional drawing of a third embodiment of the invention.

FIG. 3A shows a view of the third embodiment shown in FIG. 3 from the direction of the arrow C.

FIG. 4 is a cross-sectional drawing of a fourth embodiment of the invention.

FIG. 4A shows a view of the fourth embodiment shown in FIG. 4 from the direction of the arrow C.

DETAILED DESCRIPTION OF THE PREFERRED EMBODIMENTS

Figure 5:
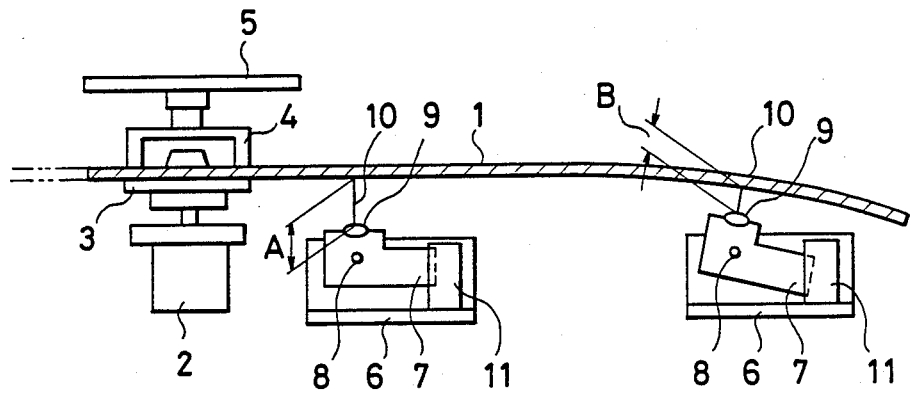
FIG. 5 is a cross-sectional drawing of the apparatus of the prior art.
Figure 6:
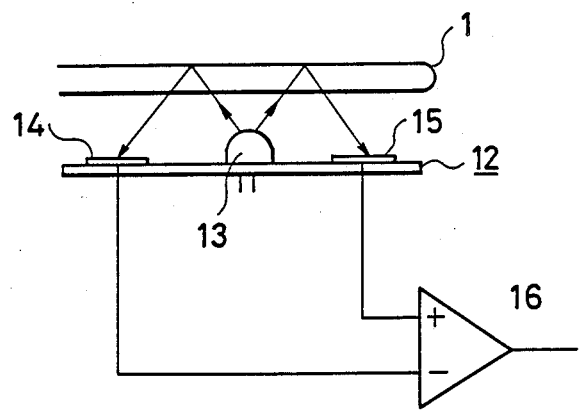
FIG. 6 is an enlarged view of part of the apparatus of the prior art.

FIG. 1 shows a cross-sectional view of an embodiment of this invention. FIG. 1A is a view of the embodiment from direction C in FIG. 1. Components numbered from 1 to 10 and 12 to 16 in these drawings are the same as in the apparatus of the prior art.

In this embodiment, however, the optical head 7 is mounted in a fixed position on the sliding base 6, and the detection means 12 is located at the circumference of the information-carrying medium 1.

There is also provided a temperature-adjusting element 17 for creating a temperature difference between the two surfaces of the information-carrying medium 1, comprising in this embodiment a pair of heating elements 17A and 17B facing the two surfaces of the information-carrying medium 1 near its circumference. A control circuit 18 controls the temperature-adjusting element 17 by furnishing power to the heating elements 17A and 17B according to a signal output from the operational amplifier 16 in the detection means 12.

In the optical reading or writing apparatus constructed as described above, the disc-shaped information-carrying medium 1 is held on the turntable 3 by the clamper 4 and rotated by the action of the spindle motor 2. The detection means 12 detects the downward warp of the outer part of the information-carrying medium 1, indicated by the dashed lines in the drawing, and the detection signal of this warp is output from the operational amplifier 16. In response to this signal the control circuit 18 commands only the heating element 17B situated below the information-carrying medium 1 to generate heat, thus raising the lower surface of the information-carrying medium 1 to a higher temperature than the upper surface. Thermal expansion of the lower side of the information-carrying medium 1 then causes its outer part to bend upward until it reaches a flat, horizontal state. When the information-carrying medium 1 is horizontal and flat, the signal received from the detection means 12 causes the control circuit 18 to command the heating element 17B to stop generating heat. The surface of the information-carrying medium 1 can be maintained in the same plane by feedback of the output signal from the detection means 12 to the control circuit 18, thereby adjusting the temperature difference between the two surfaces of the information-carrying medium 1 so as to cause thermal deformation to cancel the original warp of the information-carrying medium 1. If the surface of the information-carrying medium 1 is held in this fixed plane, a perpendicular angle will be maintained between the surface of the information-carrying medium 1 and the optic axis 10 of the light beam incident on it despite motion of the optical head 7 in the radial direction. Degradation of the information reading and writing characteristics is thus prevented without causing any problems of mechanical control, and without the need for the tilt servo mechanism 11 to move the optical head 7 as in the prior art. Furthermore, since the distance A between the surface of the information-carrying medium 1 and the objective lens 9 on the optical head 7 does not vary, the objective lens 9 does not have to be moved parallel to the optic axis 10 as much as in the prior art; all that is required is a small motion to compensate for variations in positional relationships and to follow the surface deviation of the information-carrying medium 1. The size of the focus adjusting mechanism of the objective lens 9 can therefore be reduced, and with it the size of the optical head 7. As a result, the sliding base 6 can carry a much smaller mass than before, so the sliding base 6 and the optical head 7 can be driven at high speeds (enabling fast access time).

As an added effect, the temperature-adjusting element 17 can be used to remove condensed moisture. In this case heat is generated from both the upper and lower heating elements 17A and 17B, without deforming the information-carrying medium 1.

A second embodiment of this invention is shown in cross-sectional drawing in FIG. 2. FIG. 2A shows a view of the second embodiment from direction C. In this embodiment a greater number of heating elements 17A to 17D are provided.

The heating elements 17A and 17B are disposed in a radially outer region. The heating elements 17C and 17D are disposed in a radially inner region. The heating elements 17A and 17D can create a temperature difference in the radial direction on one surface of the information-carrying medium 1, enabling to afford finer control for correcting warp in the information-carrying medium 1. For instance, it may be so arranged that the outer portion is heated to the temperature higher than the inner portion. This arrangement is advantageous where the portion of information-carrying medium 1 facing the outer heating elements 17A and 17B has greater warp than the portion facing the inner heating elements 17C and 17D.

The detection means 12 can be driven in the radial direction in association with the movement of the optical head 7, for example by mounting the detection means 12 on the optical head 7 or the sliding base 6. In this case energizing of outer heating elements 17A and 17B are controlled in accordance with the outputs of the detection means 12 produced when the detection means 12 is in the radially outer region, while energizing of inner heating elements 17C and 17D are controlled in accordance with the outputs of the detection means 12 produced when detection means 12 is in the radially inner region.

Furthermore, there can be provided two detection means located at different radial positions. In this case, the outer heating elements 17A and 17B and the inner heating elements 17C and 17D can be controlled according to the respective outputs from the two detection means.

A third embodiment of this invention is shown in cross-sectional drawing in FIG. 3. FIG. 3A shows a view thereof from direction C. In this embodiment the temperature-adjusting element 17 comprises heating elements 17A and 17B and cooling elements 17E and 17F.

The heating element 17A and the cooling element 17E are disposed to face one surface of the information-carrying medium 1. The heating element 17B and the cooling element 17F are disposed to face the other surface of the information-carrying medium 1. The heating element 17A (or 17B) on one side of the information-carrying medium 1 and the cooling element 17F (or 17E) on the other side of the information-carrying medium 1 are activated simultaneously. If the heat generation by the heating element 17A (or 17B) and the heat absorption by the cooling element 17F (or 17E) are designed to be equal to each other, simultaneous use of them will not change the ambient temperature. In other words, correction of the warp can be achieved without affecting the environment.

A fourth embodiment of this invention is shown in cross-sectional drawing in FIG. 4. FIG. 4A shows a view thereof from direction C. In this embodiment the temperature-adjusting element 17 comprises semiconductor elements 17G and 17H employing the Peltier effect. The Peltier effect makes the upper surface of the elements 17G and 17H into a heat source and the lower surface into a heat sink, or vice versa, depending on the direction of current flow. The ambient temperature can therefore be held constant with only one type of element 17G and 17H.

What is claimed is:

1. An optical reading or writing apparatus comprising an information-carrying medium on which information can be read or written optically, the information-carrying medium having the form of a disc rotating around a central axis and receiving a light beam from an optical head that is driven in the radial direction of the disc,
   a detection means located near the information-carrying medium, for detecting the angle between the optic axis of the light beam and the surface of the information-carrying medium,
   a temperature-adjusting element located near and facing the surface of the information-carrying medium, for creating a temperature difference between the two surfaces of the information-carrying medium and thereby causing a thermal deformation that bends the information-carrying medium in a desired direction, and
   a control circuit for receiving a signal from the detection means and controlling the temperature-adjusting element by supplying energy to it in such a way as to maintain a perpendicular relationship between the surface of the information-carrying medium and the optic axis.

2. An optical reading or writing apparatus as set forth in claim 1,
   wherein the temperature-adjusting element is located facing the information-carrying medium near its circumference.

3. An optical reading or writing apparatus as set forth in claim 1,
   wherein the detection means is located at the circumference of the information-carrying medium.

4. An optical reading or writing apparatus as set forth in claim 1,
   wherein the temperature-adjusting element comprises a plurality of elements which are disposed at different radial positions to create a temperature difference along the radial direction on a surface of the information-carrying medium.

5. An optical reading or writing apparatus as set forth in claim 4,
   wherein the detection means comprises an inner means and an outer means which are positioned in radially inner and outer regions of the information-carrying medium, respectively.

6. An optical reading or writing apparatus as set forth in claim 1,
   wherein the temperature-adjusting element comprises a heating element and a cooling element disposed on opposite sides of the information-carrying medium.

7. An optical reading or writing apparatus as set forth in claim 1,
   wherein the temperature-adjusting element is a semiconductor element employing the Peltier effect.

8. An optical reading or writing apparatus as set forth in claim 1,
   wherein the temperature-adjusting element is also used to remove condensed moisture.

9. An optical reading or writing apparatus as set forth in claim 1,
   wherein the detection means is driven in the radial direction to detect said angle at different positions along the radial direction.

* * * * *